F. M. LEAVITT.
LUBRICATION OF AUTOMOBILE TORPEDOES.
APPLICATION FILED AUG. 21, 1912.
1,150,777.
Patented Aug. 17, 1915.
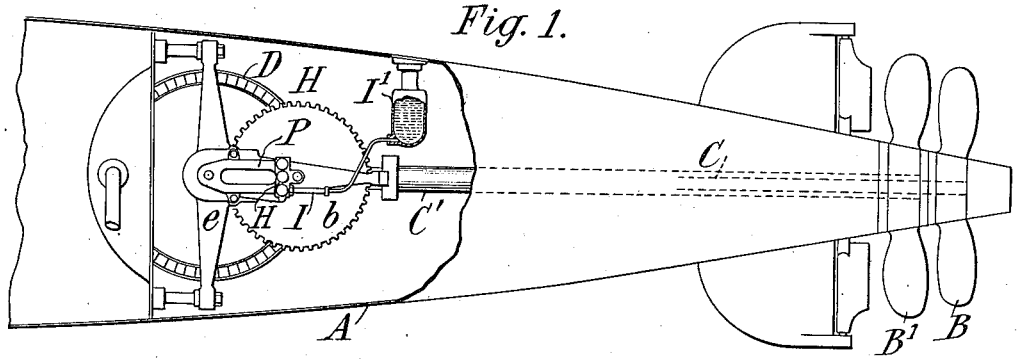
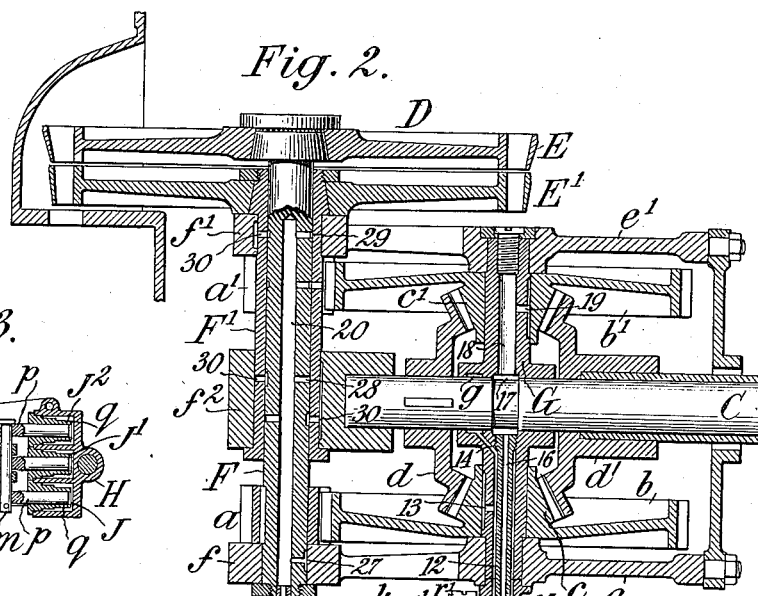
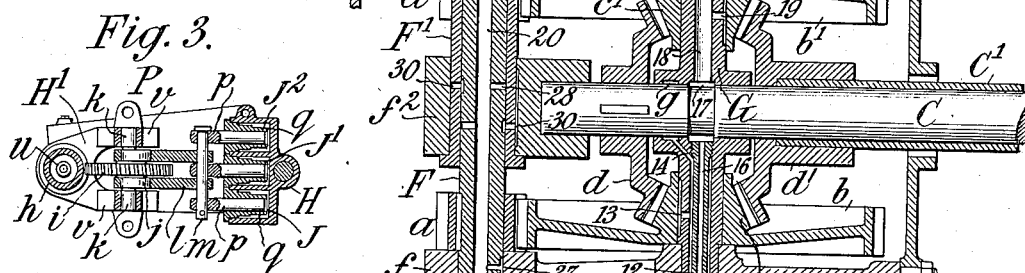
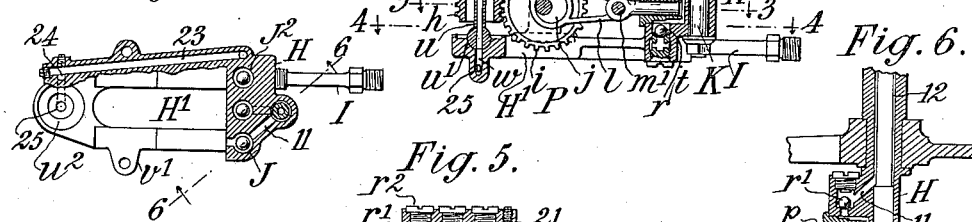
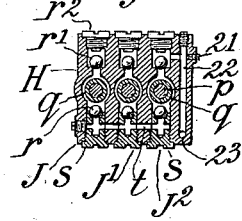
WITNESSES:
René Bruine
Fred White
INVENTOR:
Frank M. Leavitt,
By Attorneys,
Fraser, Durk & Myers

UNITED STATES PATENT OFFICE.

FRANK M. LEAVITT, OF SMITHTOWN, NEW YORK, ASSIGNOR TO E. W. BLISS COMPANY, OF BROOKLYN, NEW YORK, A CORPORATION OF WEST VIRGINIA.

LUBRICATION OF AUTOMOBILE TORPEDOES.

1,150,777.   Specification of Letters Patent.   Patented Aug. 17, 1915.

Application filed August 21, 1912.   Serial No. 716,190.

*To all whom it may concern:*

Be it known that I, FRANK M. LEAVITT, a citizen of the United States, residing in Smithtown, in the county of Suffolk and State of New York, have invented certain new and useful Improvements in Lubrication of Automobile Torpedoes, of which the following is a specification.

This invention relates to means for lubricating the shaft bearings of automobile torpedoes. Such torpedoes, especially those driven by a turbine motor, present a peculiarly difficult problem in the lubrication of the propeller shafts, the turbine shaft or shafts, and the intervening gearing.

The present invention provides a simple, compact and effective means for providing a forced flow of oil to the respective bearings during the run of the torpedo.

The invention is shown in its preferred embodiment in the accompanying drawings, wherein—

Figure 1 is a sectional elevation of the stern portion of the torpedo; Fig. 2 is a horizontal section of the turbine and gearing showing the application of the forced lubrication system; Fig. 3 is a horizontal section on the line 3—3 through the lubricating pumps; Fig. 4 is a horizontal section partly in the plane of the line 4—4; Fig. 5 is a vertical transverse section on the line 5—5 in Figs. 2 and 3; Fig. 6 is a vertical section in an oblique plane indicated by the line 6—6 in Fig. 4.

In the drawings, A designates the shell or hull of the torpedo, B B' the propeller screws, C C' the propeller shafts, D the engine or motor, which is shown as a turbine having two bucket wheels E E' mounted respectively on shafts F F'. The turbine wheels revolve in opposite directions and communicate rotation at reduced speed to the propeller shafts, which also turn oppositely. The gearing shown comprises pinions $a$ $a'$ on the turbine shafts respectively, meshing with gears $b$ $b'$ respectively, which carry bevel pinions $c$ $c'$, both of which pinions mesh on the one side with a bevel gear $d$ fixed on the shaft C, and on the other side with a bevel gear $d'$ fixed on the shaft C'. The gears $b$ $b'$ and their pinions turn on a tubular stationary shaft G which has a bearing hub $g$ in which the shaft C turns, and which at its opposite ends is confined in the opposite members $e$ $e'$ of a framework, whereby the respective gears and shaft bearings are held in position. The frame members $e$ $e'$ are provided with bearings $f$ $f'$ for the turbine shafts, and an additional bearing $f^2$ is provided for the turbine shaft F', and which serves also as a step bearing for the propeller shaft C. These bearings and the supported framework may be variously modified, and the gearing may be otherwise arranged, these details forming no part of the present invention.

The forced lubrication is afforded by means of a multiple pump P driven preferably from one of the turbine shafts. As shown, the turbine shaft F carries a worm $h$ which drives a worm wheel $i$, which in turn drives one or more eccentrics $j$. In the construction shown the worm wheel is flanked by two conincident eccentrics, and these by shaft journals $k$ $k$, all being preferably formed in one piece. The eccentrics are encircled by straps formed integrally with pitmans $l$ which at their opposite ends are connected to a cross-head or rod $m$, which in turn is engaged with the respective pump plungers $p$ $p$. The plungers are shown as three in number, each reciprocating in its own lining or pump cylinder $q$. The pump cylinders are arranged as compactly as possible side by side, and are preferably constructed by forming the three pump chambers in a single pump-frame or casting H, and bushing each chamber with a separate cylinder lining $q$. Each chamber is preferably bored through vertically to form the valve chambers in which are located the suction and discharge valves $r$ and $r'$ respectively, which are shown as ball valves. The suction valves are shown as seating upon plug seats $s$ $s$ which are bored vertically and laterally, the lateral bores communicating with a horizontal passage $t$ communicating with the suction pipe I (Fig. 2) whereby the oil is drawn from a reservoir I' into the pumps. The discharge valves $r'$ are held in place by screw plugs $r^2$ which close the chambers above them, and each discharge pump has a separate oil outlet duct or channel, these leading to the respective bearings to be lubricated.

For convenience in further description I will refer to the three individual pumps by the letters J, $J^1$ and $J^2$ respectively. The pump J has a discharge duct 11 (Fig. 6)

which communicates with a passage 12 leading to the bearing surfaces within the gear $b$ and pinion $c$ where these turn upon the stationary shaft G, and extending also to the bearing $g$. The passage 12 is best formed by introducing a pin K through a bore formed in the casting H and in the adjacent leg of the stationary shaft G, a space being left between them which serves as the passage 12. From the tubular channel thus formed a branch channel 13 completes the communication with the oil groove within the pinion $c$, and another duct 14 completes the communication with the oil groove in the bearing $g$.

From the middle pump $J^1$ an oil duct 15 (Fig. 2) leads and communicates with a bore 16 in the center of the pin K which leads the oil to an annular space 17 around the shaft C, whereby the bearing of this shaft in the hub of the stationary shaft G is further lubricated, and thence the oil flows through a bore 18 and lateral duct 19 to the oil groove within the pinion $c'$, whereby the gear $b'$ and pinion $c'$ are lubricated.

From the third pump $J^2$ an oil duct leads to a bore 20 in the turbine shaft F for lubricating the bearings of this shaft. This oil duct consists preferably of a lateral bore 21 (Fig. 5) communicating with a bore 22, and this in turn with a longitudinal bore 23 (Fig. 4), all formed in the casting H, and thence through a lateral bore 24 to a bore 25 (Fig. 2) which communicates with a bore 26 in a spindle $u$ which forms a continuation of the shaft F, and the bore of which communicates with the bore 20 in said shaft. From the bore 20 there may be any desired lateral bores, such as 27, 28 and 29, leading oil to the bearing surfaces of this shaft. If desired oil may be conducted thence through the lateral bores 30 in the shaft F' for conducting oil through this shaft to its outer bearing surfaces. Obviously the disposition of the several lateral bores 27—30 may be variously arranged according to the requirements of the bearing surfaces. For making a good rotary connection between the bores 25 and 26, the spindle $u$ is made with a terminal ball $u'$ which turns in a hemispherical socket $u^2$ in the casting H.

Thus the three pumps all draw from the suction I, $t$, and expel the oil through separate discharge ducts each leading to the bearing surfaces which are designed to be supplied by the pumps respectively. Hence each pump serves its appropriate bearings, and such bearings are supplied with oil at a rate proportionate to the capacity of the pump, irrespective of any differences in back pressure or resistance from the respective ducts. This is advantageous as compared with the use of a single larger pump having its discharge branching into a plurality of ducts leading to the respective bearing surfaces, in which case the delivery of oil would be in volume approximately inversely as the resistance offered by the respective ducts.

The multiple pump is so constructed as to be assembled independently of the turbine and propeller shafts and gearing, being fastened to the gearing frame by the single pin K which is a screw rod threaded into the hub portion of the fixed shaft G. The lateral extension H' of the casting H serves not only for inclosing ducts 23, 24, but forms also a step bearing for the spindle $u$, and serves as a support for the bearing blocks $v\ v$ of the eccentric spindle $k$, these being screwed to lugs $v'$ on this extension. The pump valves are readily accessible by unscrewing the plugs $s$ for the suction valves and the plugs $r^2$ for the discharge valves. The pump cylinder linings $q$ are fastened into the casting H in any manner usual in pump construction.

The details of construction may be greatly varied without departing from the invention. So also may the general arrangement and the driving means. My lubricating system is adapted to different arrangements of turbine and propeller shafts, and different kinds of gearing, the construction and arrangement being appropriately changed according to the particular arrangement and type of gearing adopted. Since the turbine shaft or shafts and the propeller shaft or shafts are geared together, the pump may be driven from either, whichever in any particular arrangement is found more convenient.

I claim as my invention:—

1. In an automobile torpedo, the combination with its motor shaft, propeller shaft and interposed gearing and a bearing frame therefor, of a lubricating pump comprising a frame attached removably to said bearing frame, and a pump cylinder and gear wheel carried thereby, said motor shaft having a worm driving said gear wheel.

2. In an automobile torpedo, the combination with its motor and propeller shaft and the bearing frame therefor, of a pump for lubricating the bearings thereof comprising a supporting frame having pump cylinders and valve chambers, gearing for driving said pump supported by said frame, and means for attaching said frame detachably to said bearing frame, whereby the pump may be assembled and removed independently of said bearing frame and parts, and said pump-frame and bearing-frame formed with coinciding oil-ducts, leading from the valve-chambers to the bearings to be lubricated.

3. In an automobile torpedo, the combination with its motor and propeller shaft and the bearing frame therefor having an oil duct leading to a bearing thereof, of a lubricating pump comprising a supporting frame having pump cylinders and valve chambers, gearing for driving said pump, said pump frame having an oil discharge duct communicating with said oil duct in the bearing frame, and means for attaching said pump frame to said bearing frame to bring said ducts into coincidence.

4. In an automobile torpedo, the combination with its motor and propeller shaft and the bearing frame therefor, having an oil duct leading to a bearing to be lubricated, of a lubricating pump comprising a supporting frame having pump cylinders and valve chambers, gearing for said pump, and means for attaching said pump frame to the bearing frame comprising a screw bolt passing through said pump-frame and forming a duct for leading oil from said pump to said oil-duct in the bearing frame.

5. In an automobile torpedo, the combination with its motor and propeller shaft and the bearing frame therefor, of a lubricating pump comprising a supporting frame having pump cylinders and valve chambers, gearing for said pump, and means for attaching said pump frame to the bearing frame comprising a screw pin entering a bore in said bearing frame, with a clearance between forming a duct for leading oil from said pump to a bearing to be lubricated.

6. In an automobile torpedo, the combination with its motor and propeller shaft and the bearing frame therefor, of a pump for lubricating the bearings thereof comprising a supporting frame having pump cylinders and valve chambers, gearing for said pump, and means for attaching said pump frame to the bearing frame comprising a screw pin having within it an oil duct and fitting a bore in said bearing frame to form an intervening oil duct, said ducts leading to different bearings respectively.

7. In an automobile torpedo, the combination with its motor and propeller shaft and the bearing frame therefor, of a pump for lubricating the bearings thereof comprising a supporting frame removably attached to said bearing frame, and having pump cylinders and valve chambers, said pump frame having an oil discharge duct terminating in a socket in line with the shaft to be lubricated, and said shaft having a tubular extension fitting said socket and communicating with said duct for leading the oil to the bearing surfaces of said shaft.

8. In an automobile torpedo, the combination with a turbine motor, propeller shaft, interposed gearing and bearing frame therefor comprising a shaft parallel with a turbine shaft, of an oil pump comprising a pump frame attached to said bearing frame, having pump cylinders and valve chambers, and separate discharge ducts, the one communicating with a duct in said stationary shaft and another with a duct in said rotary shaft, said ducts leading to the respective bearings to be lubricated.

9. In an automobile torpedo, the combination with a turbine motor, propeller shaft, interposed gearing and bearing frame therefor, said frame comprising a stationary shaft parallel with a turbine shaft, of an oil pump comprising a pump frame attached to said bearing frame, having triple pump cylinders, valve chambers, and plungers, driving means therefor, and ducts leading from the respective discharge valves, the duct from one pump cylinder leading through said stationary shaft to one bearing, the duct from the second pump cylinder leading through said stationary shaft to another bearing, and the duct from the third pump cylinder communicating with a duct in said turbine shaft leading to a bearing thereof.

In witness whereof, I have hereunto signed my name in the presence of two subscribing witnesses.

FRANK M. LEAVITT.

Witnesses:
PETER KRUSE,
FRED. H. McGAHIE.